United States Patent
Laitala et al.

(10) Patent No.: US 9,725,787 B2
(45) Date of Patent: Aug. 8, 2017

(54) PROCESS AND EQUIPMENT FOR PRODUCING PURE LITHIUM-CONTAINING SOLUTION

(71) Applicant: OUTOTEC (FINLAND) OY, Espoo (FI)

(72) Inventors: Hannu Laitala, Kaunianen (FI); Janne Karonen, Kokemäki (FI); Liisa Haavanlammi, Espoo (FI)

(73) Assignee: Outotec (Finland) Oy, Espoo (FI)

( * ) Notice: Subject to any disclaimer, the term of this patent is extended or adjusted under 35 U.S.C. 154(b) by 63 days.

(21) Appl. No.: 14/402,178

(22) PCT Filed: Jun. 4, 2013

(86) PCT No.: PCT/FI2013/050603
§ 371 (c)(1),
(2) Date: Nov. 19, 2014

(87) PCT Pub. No.: WO2013/182749
PCT Pub. Date: Dec. 12, 2013

(65) Prior Publication Data
US 2015/0147248 A1  May 28, 2015

(30) Foreign Application Priority Data
Jun. 5, 2012 (FI) ..................... 20125610

(51) Int. Cl.
| C22B 26/00 | (2006.01) |
| C22B 26/12 | (2006.01) |
| C01D 15/08 | (2006.01) |
| C22B 3/44 | (2006.01) |
| C01D 15/00 | (2006.01) |
| C22B 7/00 | (2006.01) |

(52) U.S. Cl.
CPC .............. *C22B 26/12* (2013.01); *C01D 15/00* (2013.01); *C01D 15/08* (2013.01); *C22B 3/44* (2013.01); *C22B 7/006* (2013.01); *Y02P 10/234* (2015.11)

(58) Field of Classification Search
CPC ......... C22B 26/20; C22B 26/22; C22B 26/12; C22B 7/006; C22B 3/44; C01D 15/00; C01D 15/08
USPC .............................. 423/157, 179.5
See application file for complete search history.

(56) References Cited

U.S. PATENT DOCUMENTS

| 3,449,088 | A | * | 6/1969 | Lee | .......... | C01D 15/04 423/157 |
| 3,514,266 | A | * | 5/1970 | Dean | .......... | C01D 17/00 423/112 |
| 4,271,131 | A | | 6/1981 | Brown et al. | | |
| 5,219,550 | A | * | 6/1993 | Brown | .......... | C01D 15/08 423/179.5 |
| 5,993,759 | A | * | 11/1999 | Wilkomirsky | .......... | C01D 15/08 23/302 R |
| 6,048,507 | A | * | 4/2000 | Amouzegar | .......... | C01D 15/08 423/179.5 |
| 6,143,260 | A | * | 11/2000 | Boryta | .......... | C01D 15/08 423/163 |
| 2001/0028871 | A1 | | 10/2001 | Harrison et al. | | |
| 2003/0228251 | A1 | | 12/2003 | Boryta et al. | | |
| 2007/0160516 | A1 | * | 7/2007 | Boryta | .......... | C01D 15/08 422/187 |
| 2012/0189516 | A1 | * | 7/2012 | Donaldson | .......... | C01D 3/08 423/179.5 |
| 2014/0334997 | A1 | * | 11/2014 | Ehren | .......... | C01D 15/08 423/179.5 |

FOREIGN PATENT DOCUMENTS

| CL | 138-01 | 1/2001 |
| CL | 2190-01 | 9/2001 |
| CL | 2473-14 | 9/2014 |
| CL | 2957-14 | 10/2014 |
| CN | 1618997 A | 5/2005 |
| CN | 101698488 A | 4/2010 |
| CN | 102168183 | 8/2011 |

(Continued)

OTHER PUBLICATIONS

Bukowsky H. et al., "The Separation of Calcium and Magnesium from Lithium Chloride by Liquid-Liquid Extraction with DI (2-Ethylhexyl) Phosporic Acid", Hydrometallurgy, Elsevier Scientific Publishing Cy, Amsterdam, NL, vol. 28, No. 3, Apr. 1, 1992, pp. 323-329.

(Continued)

*Primary Examiner* — Steven Bos
(74) *Attorney, Agent, or Firm* — Chernoff Vilhauer LLP

(57) ABSTRACT

The invention relates to a process for producing a lithium-containing solution from a lithium-containing raw-material solution, by: a) precipitating a first part of magnesium and calcium from the lithium-containing raw-material solution, b) extracting a second part of calcium and magnesium from the lithium-containing solution by liquid-liquid extraction, a resultant product being a lithium-containing solution. The invention also relates to equipment for producing a lithium-containing solution from a lithium-containing raw-material solution, including a precipitation unit to remove a first part of magnesium and calcium and an extraction unit to receive the lithium-containing raw-material solution and to remove therefrom a second part of calcium and magnesium by liquid-liquid extraction, and control unit to control the operation of the precipitation unit.

17 Claims, 4 Drawing Sheets

(56) References Cited

FOREIGN PATENT DOCUMENTS

| | | | |
|---|---|---|---|
| DE | 3622105 A1 | | 1/1988 |
| DE | 29428 A5 | | 9/1991 |
| WO | 9929624 A1 | | 6/1999 |
| WO | 2010/006366 | * | 1/2010 |
| WO | 2013/036983 | * | 3/2013 |

OTHER PUBLICATIONS

English Abstract from Zhang Guiping et al., Separation of magnesium and lithium by solvent extraction using di-(2-ethylhexyl) phosphoric acid (D2EHPA). Journal of Tsinghua University Science and Technology, Mar 2010, vol. 50, No. 3, pp. 430-433.
Search Report from priority Finnish Application No. 20125610, dated Mar. 6, 2013, 2 pgs.
International Search report from corresponding PCT Application No. PCT/FI2013/050603, date of mailing of search report Nov. 7, 2013, 3 pgs.
SIPO, Notification of the First Office Action for corresponding Chinese Patent Application No. 201380029268.1, dated Sep. 8, 2015 (Sep. 8, 2015), pp. 20, including English translation.
H. Bukowsky et. al., "The separation of calcium and magnesium from lithium chloride by liquid-liquid extraction with di(2-ethylhexyl) phosphoric acid", Hydrometallurgy, vol. 28, dated Apr. 1, 1992 (Apr. 1, 1992), pp. 323-329.
Search Report prepared by the Chilean Patent Office for CL 2014-00329 Dec. 22, 2016, 9 pages.

* cited by examiner

PROCESS AND EQUIPMENT FOR PRODUCING PURE LITHIUM-CONTAINING SOLUTION

This is a national stage application filed under 35 USC 371 based on International Application No. PCT/FI2010/050811 filed Oct. 19, 2010 and claims priority under 35 USC 119 of Finnish Patent Application No. 20096071 filed Oct. 19, 2009.

(b) CROSS-REFERENCE TO RELATED APPLICATIONS

This is a national stage application filed under 35 USC 371 based on International Application No. PCT/FI2013/050603 filed 4 Jun. 2013 and claims priority under 35 USC 119 of Finnish Patent Application No. 20125610 filed 5 Jun. 2012.

(c) STATEMENT REGARDING FEDERALLY SPONSORED RESEARCH OR DEVELOPMENT

Not Applicable.

(d) THE NAMES OF THE PARTIES TO A JOINT RESEARCH AGREEMENT

Not Applicable.

(e) INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

(f) STATEMENT REGARDING PRIOR DISCLOSURES BY THE INVENTOR OR A JOINT INVENTOR

Not Applicable.

FIELD OF THE INVENTION

The invention relates to a process and equipment for producing a lithium-containing solution from a lithium-containing raw-material solution. From the lithium-containing solution obtained as a product it is further possible to produce a pure lithium carbonate product.

(g) BACKGROUND OF THE INVENTION

A significant part of the world's lithium resources are found in natural brine sediments. Many of them contain large amounts of impurities, such as boron, magnesium and calcium as well as sulphate. In lithium recovery, the brine purifying techniques are currently based on selective precipitation of magnesium and calcium by means of sodium carbonate in such a way that the main part of the lithium will remain in the solution. The sodium carbonate is, however, a relatively expensive chemical and the sodium carbonate precipitation results in fairly high lithium losses (about 20%) as the lithium precipitates with alkaline earth metals.

At present, lithium is most widely used in glass and ceramic industry and in accumulator and battery solutions. The need for lithium in the battery industry increases as the development of electric cars advances. In lithium applications the lithium carbonate is an important intermediate product.

U.S. Pat. No. 5,219,550 discloses a process for producing a pure lithium carbonate. According to said publication, the starting material is a naturally occurring lithium-containing brine that is first concentrated by evaporation of water, either by heating or through solar energy, in pools. In the saline solution obtained after evaporation, magnesium and calcium are present as chlorides, as is lithium. In concentration, the presence of sulphates is to be avoided, but if they occur, they may be removed, for instance, by adding a calcium compound to precipitate the sulphate as gypsum. For removal of boron, it is advantageous that it is present as boric acid, and therefore to the saline solution may be added hydrochloric acid, for instance. Boron is separated from the saline solution by extracting it by means of a fatty alcohol. The boron-free saline solution is subjected to removal of magnesium and calcium by precipitation and solid-liquid separation. Lithium is separated from the brine by precipitating it as lithium carbonate using sodium carbonate.

U.S. Pat. No. 5,993,759 discloses a process for producing lithium carbonate from brine. The brine is first treated with a hydrochloric acid solution, for instance, whereby some of the boron reacts to a boric acid. The remaining boron is recovered from the solution by extraction. Next, magnesium and calcium are removed from the saline solution. Prior to removal of magnesium and calcium the solution is diluted such that the lithium content will be just 0.1 to 0.3% by weight, which prevents precipitation of large amounts of lithium in connection with magnesium precipitation. Magnesium is precipitated from the diluted saline solution in two stages, in the first stage using sodium carbonate and in the second stage using calcium hydroxide and sodium carbonate. In the second stage of magnesium removal also the calcium in the saline solution precipitates as calcium carbonate from the solution. After removal of impurities, the lithium is precipitated as lithium carbonate from the saline solution using sodium carbonate, a typical yield from recovery being about 80 to 90%.

In the article by Bukowsky, H. et al., "The separation of calcium and magnesium from lithium chloride by liquid-liquid extraction with di(2-ethylhexyl) phosphoric acid", Hydrometallurgy, 28 (1992), pages 323-329, there is described separation of calcium and magnesium from a lithium chloride solution. According to the article, calcium and magnesium are well separable from a lithium chloride solution by using 0.5 M D2EHPA as extractant in a two-stage extraction. The same is also stated in DD patent publication 294284 (1991).

OBJECT OF THE INVENTION

The object of the invention is to provide a more economical process than before for recovering lithium from lithium-containing raw-material solutions, such as naturally occurring brines. By means of the process it is possible to reduce co-precipitation of lithium and thereby lithium losses, which appear in prior art processes, in particular, in connection with precipitation of calcium and magnesium. By means of the process of the invention it is also possible to eliminate the need for diluting process solutions, which would increase the size of process equipment and thereby the investment costs.

(h) BRIEF SUMMARY OF THE INVENTION

The present invention relates to a process for producing a lithium-containing solution from a lithium-containing raw-material solution, the process comprising the following steps:

a) precipitation step, in which a first part of magnesium and calcium is removed from the lithium-containing raw-material solution by precipitation, b) extraction step, in which a second part of calcium and magnesium is removed from the lithium-containing solution obtained from the precipitation step by liquid-liquid extraction, a resultant product being a lithium-containing solution.

According to an embodiment of the invention, the lithium-containing raw-material solution is a brine solution available, for instance, from natural reserves, typically from naturally occurring brines. A natural brine solution, interesting with respect to lithium, typically contains lithium more than 15 g/l. A good-quality deposit contains dissolved lithium up to 40 g/l. The main anion in the brine is a chloride. Sulphate may also occur. Of other dissolved metals, the most frequent impurities are magnesium and calcium. Boron content may also exceed 5 g/l, and consequently removal of boron is necessary for separating a pure lithium product.

According to an embodiment of the invention, removal of a first part of magnesium and calcium from the raw-material solution is performed by precipitation. According to an embodiment of the invention, in the precipitation step, sodium carbonate is used as a precipitant. In addition, in the precipitation it is possible to use calcium hydroxide, whereby sulphate can be separated into a solid matter as gypsum. Typically, magnesium and calcium mainly precipitate as carbonates, but sulphate and hydroxide deposits of metals may also be present.

According to an embodiment of the invention, the first part of calcium and magnesium removed from the solution in the precipitation step represents 50 to 95% by weight of the total amount of calcium and magnesium in the total raw-material solution.

According to an embodiment of the invention, the calcium and magnesium precipitation step is continued until 50 to 95% by weight of the total amount of calcium and magnesium will be precipitated and removed from the solution.

According to an embodiment of the invention, the process comprises assaying the composition of a lithium-containing raw-material solution prior to precipitation, or the composition of a feed into precipitation, or the composition of a solution in precipitation, determining, on the basis of said composition, the amount of a precipitant that removes from the raw-material solution said predetermined first part of magnesium and calcium, and dispensing said determined amount of precipitant into a precipitation unit.

According to an embodiment of the invention, compositions of the precipitation-stage solution are measured during the precipitation process, and the precipitation process is discontinued and the solution is conveyed to a next process step, when the composition of the solution achieves a set value.

According to an embodiment of the invention, when the composition of the solution is assayed, an analysis method is used for assaying one or more ion contents in a solution, selected from the following: Ca, Mg, Li, $SO_4$, Cl, OH, and on the basis of the obtained result, it will be decided which precipitant or precipitants to use and how much. According to an embodiment of the invention, when the composition of a solution is assayed, a calcium ion, magnesium ion or lithium ion content is assayed. According to an embodiment of the invention, the total content of calcium ion and magnesium ion is assayed.

According to an embodiment of the invention, the raw-material solution is assayed for the total content of calcium and magnesium in the solution, and on the basis thereof is determined the amount of a precipitant or precipitants to be fed into the precipitation step in such a way that a first part, i.e. 50 to 95% by weight, of the calcium and magnesium present in the raw-material solution is precipitated. Typically, the precipitant used is sodium carbonate, additionally calcium hydroxide may be used. Thus, according to an embodiment of the invention, the progress of the precipitation step is adjusted in such a way that on the basis of the Ca and Mg contents, assayed from the raw-material solution, and the desired precipitation degree, which is typically within the range of 50 to 95% by weight of the amounts contained in the raw-material solution, there is determined the necessary amount of sodium carbonate.

According to an embodiment of the invention, at the beginning of the precipitation step, the magnesium and calcium content of the solution may be assayed by any known assay method. The assay may be repeated sufficiently frequently during the precipitation step. When the magnesium and calcium concentrations go below a predetermined set value, the precipitation process is terminated and the solution obtained from the precipitation step, separated from solid matter, is conducted to a next process step. The set value of magnesium and calcium, on the basis of which the precipitation step is terminated, may be 50 to 95% by weight lower than the Mg and Ca concentrations at the beginning of the precipitation step.

According to an embodiment of the invention, the precipitation step may be performed in two stages, whereby in the first stage there is added calcium hydroxide, precipitating gypsum, and in the second stage there is added sodium carbonate for precipitating magnesium and calcium, and consequently, in the solution there will be a set value amount of magnesium and calcium and the lithium will remain in the solution.

According to an embodiment of the invention, the development of the lithium content in the solution of the precipitation step is measured during the precipitation step. If the lithium content drops more than 10% by weight with respect to the initial situation, precipitation is interrupted to stop the lithium precipitation and the process solution is conveyed to a next process step. The lithium content may be followed and monitored by known assay methods and process control devices.

According to an embodiment of the invention, the second part. i.e. the rest, of the calcium and magnesium the raw-material solution initially contained, is 5 to 50% by weight of the total amount of calcium and magnesium in the entire raw-material solution.

According to an embodiment of the invention, the precipitation step is performed to precipitate calcium and magnesium 50 to 95% by weight of the total amount of calcium and magnesium contained in the raw-material solution, and at the same time, to precipitate lithium at most 10% by weight of the lithium contained in the raw-material solution.

According to an embodiment of the invention, the calcium and magnesium precipitation step is continued until 10% by weight, at most, of the lithium in the raw-material solution will be precipitated along with the precipitation of the first part of calcium and magnesium.

According to an embodiment of the invention, the solution obtained from the precipitation step is subjected to an extraction step, in which the second part of magnesium and calcium is removed from the solution by selective liquid-liquid extraction. In the liquid-liquid extraction there is selected an extractant that does not separate lithium from an aqueous solution feed into an organic phase. After the extraction step, magnesium and calcium concentrations in the aqueous phase are typically less than 0.01 g/l.

According to an embodiment of the invention, the extraction step employs an organic extractant. According to an embodiment of the invention, the extraction step employs a calcium and magnesium selective extractant, which contains e.g. dialkyl phosphoric acid, such as di-2-ethyl hexyl phosphoric acid, or dialkyl phosphonic acid, or dialkyl phosphinic acid, or a mixture thereof.

The extraction step may include a stripping step of calcium and magnesium, and a hydrochloric-acid-containing aqueous solution is used as a stripping solution, whereby the hydrochloric-acid-containing aqueous solution containing calcium and magnesium, obtained after the stripping step, may be conveyed back to an earlier process step.

According to an embodiment of the invention, the process comprises, in addition to the precipitation step and the extraction step, at least one pre-treatment step of lithium-containing raw-material solution prior to the precipitation step, which pre-treatment step is selected from the group of evaporation of the lithium-containing raw-material solution, dissolution of carbonates, typically magnesium and calcium carbonates, of the raw-material solution in a lithium-containing raw-material solution, or removal of boron from a lithium-containing raw-material solution. When the lithium-containing raw-material solution is pre-treated, there is typically obtained a feed into the precipitation step.

According to an embodiment of the invention, from the lithium-containing solution obtained as a product by the process lithium carbonate is precipitated by means of sodium carbonate. The obtained lithium carbonate precipitate is recovered and it is extremely pure and typically contains more than 99% by weight lithium carbonate.

According to an embodiment of the invention, in the process, at most 10% by weight of the lithium in the raw-material solution co-precipitates with the first part of magnesium and calcium.

A feature of the invention is equipment for producing a lithium-containing solution from a lithium-containing raw-material solution, the equipment comprising:

a precipitation unit arranged to remove a predetermined first part of magnesium and calcium from a lithium-containing raw-material solution by precipitating them, an extraction unit arranged to receive from the precipitation unit the lithium-containing raw-material solution and to remove therefrom a second part of calcium and magnesium by liquid-liquid extraction obtaining a lithium-containing solution as a product, and control means for controlling the operation of the precipitation unit to remove from the lithium-containing raw-material solution said predetermined first part of magnesium and calcium.

According to an embodiment of the invention, a control unit is arranged to assay the composition of the lithium-containing raw-material solution prior to precipitation, or the composition of a feed into the precipitation unit, or the composition of the solution in the precipitation unit, to determine, on the basis of said composition, the amount of a precipitant that removes from the raw-material solution said predetermined first part of magnesium and calcium, and to dispense said determined amount of precipitant into the precipitation unit.

In the equipment according to an embodiment of the invention, the precipitation unit comprises one or more successive precipitation reactors, and the extraction unit comprises a liquid-liquid extraction unit.

(i) BRIEF DESCRIPTION OF THE SEVERAL VIEWS OF THE DRAWINGS

(j) DETAILED DESCRIPTION OF THE INVENTION

Figure 1:
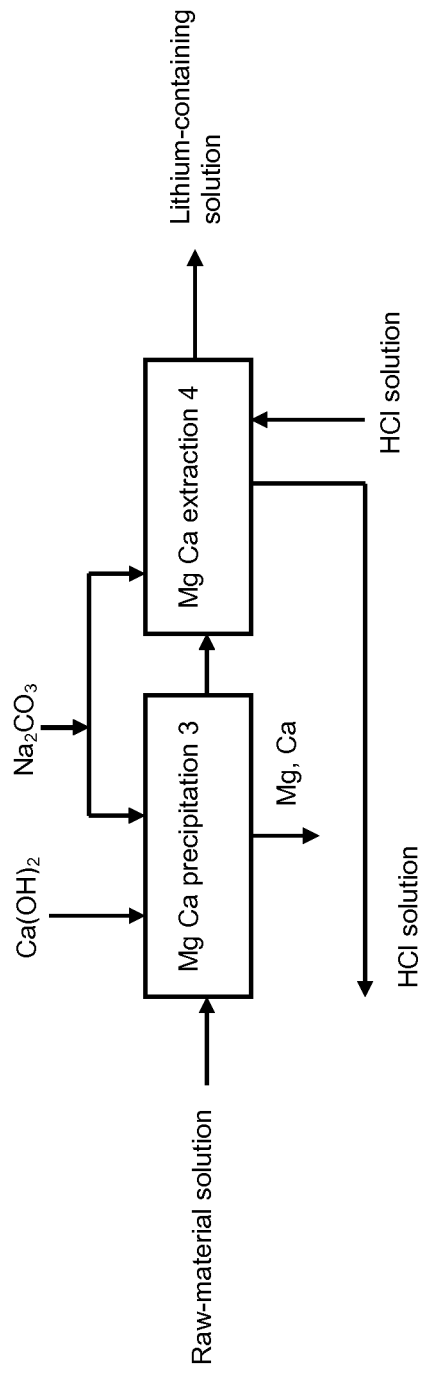
FIG. 1 shows schematically an exemplary embodiment of the process according to the invention.

In accordance with the prior art, when pure lithium carbonate is produced from brine, it is typical of the processes that boron is first removed from the solution and thereafter calcium and magnesium. Liquid-liquid extraction is a typical manner to remove boron from the solution. Calcium and magnesium are often removed by carbonate precipitation. Removal of calcium and magnesium may also be carried out by extraction. Prior art publications also reveal that a lithium salt is readily precipitated in connection with magnesium and calcium precipitation. This deteriorates lithium yield in an end product and increases a need for recycling in the processes. In prior art solutions, in order to prevent co-precipitation of lithium the brine solution has been considerably diluted, for instance, and yet the lithium yield has only been about 80 to 90% by weight. Dilution also increases the size of process equipment, and consequently the investment and operating costs also increase.

The now invented process is based on performing the removal of calcium and magnesium from a lithium-containing raw-material solution in two stages so as to ensure the highest possible yield and purity of lithium. In the process of the invention, a first part of the calcium and magnesium contained in the lithium-containing raw-material solution is removed by carbonate precipitation, and the precipitation uses sodium carbonate and as an additive it is possible to use calcium hydroxide. In the precipitation step of the process according to the invention, the lithium-containing raw-material solution is contacted with sodium carbonate and possibly with calcium hydroxide so as to provide a precipitate. The obtained precipitate is a mixed precipitate which mainly contains carbonates, and depending on the additives used and components contained in the feed, also sulphates and hydroxides. It is possible to carry out carbonate precipitation without using calcium hydroxide as an aid, when the feed does not contain sulphates. The first part of calcium and magnesium comprises the majority of their amount in the raw-material solution, preferably 50 to 95% by weight of their total amount in the raw-material solution. Surprisingly, it was found that when these metals are not precipitated completely, but 50 to 95% by weight of the total amount of calcium and magnesium contained in the raw-material solution is precipitated, lithium is co-precipitated for at most 10% by weight of the lithium contained in the raw-material solution. The precipitation step is continued until the first part, i.e. 50 to 95% by weight, of the calcium and magnesium contained in the raw-material solution is precipitated. When the precipitation of magnesium and calcium is not brought to completion, savings are also achieved in the amount of costly precipitants.

The composition of the raw-material solution is determined by assaying the content of one or more ions in the raw-material solution, the ion/ions being selected from among the following: calcium, magnesium, lithium, sulphate, chloride and hydroxide. On the basis of the composition it is determined which precipitant or precipitants to use and how much.

Typically, the raw-material solution is assayed for the calcium and magnesium content, and on the basis of it and the desired precipitation degree, which is within the range of 50 to 95% by weight of the total calcium and magnesium content in the raw-material solution, there is determined the necessary amount of the precipitant or precipitants.

The second part, i.e. the rest of the calcium and magnesium, is separated from the raw-material solution by extraction, which is primarily a so-called polishing of the solution. In the process, the extraction step is carried out by contacting the lithium-containing solution, from which the first part of magnesium and calcium is removed, with the extractant, whereby the remaining magnesium and calcium in the solution are transferred to the extractant. The second part, i.e. the rest of the calcium and magnesium to be removed, comprises 5 to 50% by weight of the magnesium and calcium initially contained in the raw-material solution. The obtained product will be a lithium-containing solution that contains at least 90% by weight of the lithium contained in the raw-material solution. The lithium may be recovered from the product solution at very high yield through precipitation as lithium carbonate. By precipitating lithium carbonate from the lithium-containing product solution, the obtained product will be lithium carbonate of at least technical grade. The lithium-containing product solution typically contains a small amount of calcium and magnesium, the presence of which cannot be avoided. Typically, they remain in the product solution for about 0.01 g/l.

In the following, the invention is described in greater detail by means of FIG. 1. According to an embodiment of the invention, the lithium-containing raw-material solution is fed into a magnesium and calcium precipitation step 3, where a first part of the Mg and Ca in the solution is removed by precipitating them from the solution. In the precipitation, sodium carbonate is used, and in addition to the conventional sodium carbonate, it is also possible to use, as an aid, calcium hydroxide which is less expensive. In that case, precipitation mainly occurs by means of sodium carbonate, and calcium hydroxide is used for raising pH. The calcium hydroxide also precipitates, to some extent, calcium and magnesium. In the first step is removed most of the calcium and magnesium in the raw-material solution, the amount being about 50 to 95% by weight of the total calcium and magnesium in the solution. Typically, the amount of the precipitant and precipitants used is decided on the basis of the Ca and Mg content of the raw-material solution to the effect that the amount of the precipitant or precipitants used is such that 50 to 95% by weight of the calcium and magnesium contained in the raw-material solution will precipitate. The obtained mixed precipitate, i.e. Mg—Ca-hydroxide-sulphate-carbonate precipitate, is removed from the solution and the lithium-containing raw-material solution is conveyed to removal of the second part of calcium and magnesium. The mixed precipitate formed in the precipitation step mainly contains carbonates. Sulphates and hydroxides are present less or not at all in the mixed precipitate.

The precipitation step 3 is carried out in any equipment suitable for the purpose. Typically, the precipitation step 3 is carried out by using two reaction vessels.

The removal of the second part of calcium and magnesium from the lithium-containing raw-material solution takes place in the extraction step 4, in which the rest of the calcium and magnesium is removed by liquid-liquid extraction. The second part, i.e. the rest of the calcium and magnesium, comprises 5 to 50% by weight of the magnesium and calcium contained in the raw-material solution. The pH of the raw-material solution is adjusted appropriate, typically to pH value of 3 to 6, by means of soda ash feed, i.e. sodium carbonate feed. As an extractant there is used any calcium and magnesium selective extractant, whereby the calcium and magnesium are extracted in the extractant and the lithium to be recovered later will remain in the lithium-containing product solution. Thus is obtained a lithium-containing product solution, wherefrom lithium may be recovered at very high yield. Calcium and magnesium may be returned in an acidic stream to the beginning of the process, typically, for instance, to dissolution of carbonates prior to removal of boron.

The organic extractant is selected to be one that does not extract lithium. Typically, the extractant contains dialkyl phosphoric acid, e.g. D2EHPA, i.e. di-2-ethyl hexyl phosphoric acid, dialkyl phosphonic acid or dialkyl phosphinic acid or any mixture thereof. Examples of commercially available extractants include D2EHPA, Ionquest 801 and Cyanex 272.

The extraction step is carried out as liquid-liquid extraction in any equipment suitable for the purpose. In the extraction step, magnesium and calcium are transferred into the extractant as bivalent ions. Typically, the extraction step includes stripping of an organic solvent or an organic phase. In stripping, calcium and magnesium are extracted in a stripping solution to obtain chloride salts. To serve as the aqueous solution of stripping it is preferable to select a hydrochloric acid-containing aqueous solution, which may be conveyed, after stripping, for instance to an earlier process step, such as a pre-treatment of the lithium-containing raw-material solution, typically to the carbonate dissolution step.

Figure 2:
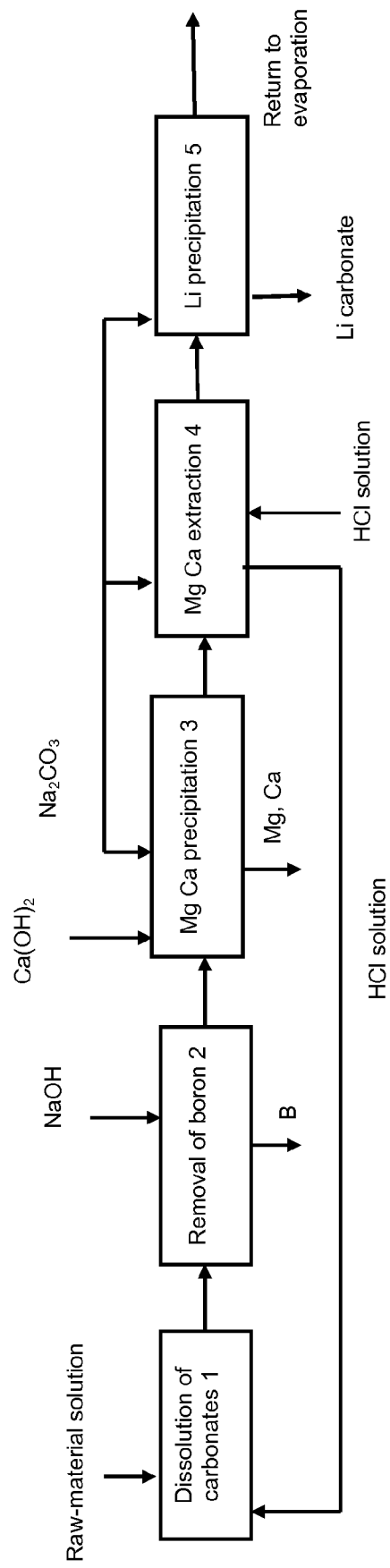
FIG. 2 shows schematically a second exemplary embodiment of the process according to the invention.

Pre-treatment steps may be performed on the lithium-containing raw-material solution, depending on the composition of the lithium-containing raw-material solution to be treated, for instance, evaporation, dissolution of carbonates and/or removal of boron, depending on the components contained in the lithium-containing raw-material solution. Of the pre-treatment steps, it is possible to perform all or just one or some of them. The invention is further described by means of the schematic view of FIG. 2. FIG. 2 shows an exemplary embodiment of the invention, and according thereto, the lithium-containing raw-material solution may be subjected to pre-treatments. The lithium-containing raw-material solution may be first evaporated in evaporation pools (not shown in FIG. 2), and thereafter the carbonate compounds contained in the raw-material solution may be dissolved and the boron removed. The lithium-containing raw-material solution, which is brine, for instance, is conveyed to a carbonate dissolution step 1. It is possible to convey to the dissolution step a hydrochloric acid containing aqueous solution from a subsequent process step, which aqueous solution also contains calcium and magnesium. By means of the hydrochloric acid solution to be fed into the raw-material solution are dissolved the carbonates, typically Mg and Ca carbonates, of the raw-material solution, and they form chloride compounds. This process step is performed in acidic conditions.

After the dissolution of carbonates, the lithium-containing raw-material solution is subjected to removal of boron 2, which in accordance with the diagram is performed by liquid-liquid extraction using a boron-selective extractant known per se, typically a diol compound. To the boron removal step there is also fed sodium hydroxide, whereby the boron is recovered from the extractant in the stripping step.

Next, the boron-depleted, lithium-containing raw-material solution is conveyed to a magnesium and calcium precipitation step 3, which is performed in the same manner as that described in connection with FIG. 1.

From the calcium and magnesium precipitation step 3 the lithium-containing raw-material solution is conveyed to an extraction step 4, which is implemented as described in connection with FIG. 1.

By means of the extraction step 4 Ca and Mg may be removed from the raw-material solution so completely that, when the lithium-containing solution is fed from step 4 into the lithium precipitation step 5, a pure lithium carbonate product may be precipitated using sodium carbonate as a precipitation aid. The calcium-magnesium extraction uses as a stripping solution a hydrochloric acid-containing solution, which is conveyed, after stripping, to the pre-treatment step of the lithium-containing raw-material solution, to the dissolution of carbonates 1. The residual lithium-depleted solution from the lithium precipitation may be conveyed, for instance, back to evaporation pools of lithium brines in order to enable recovery of the residual lithium in the solution.

Figure 3:
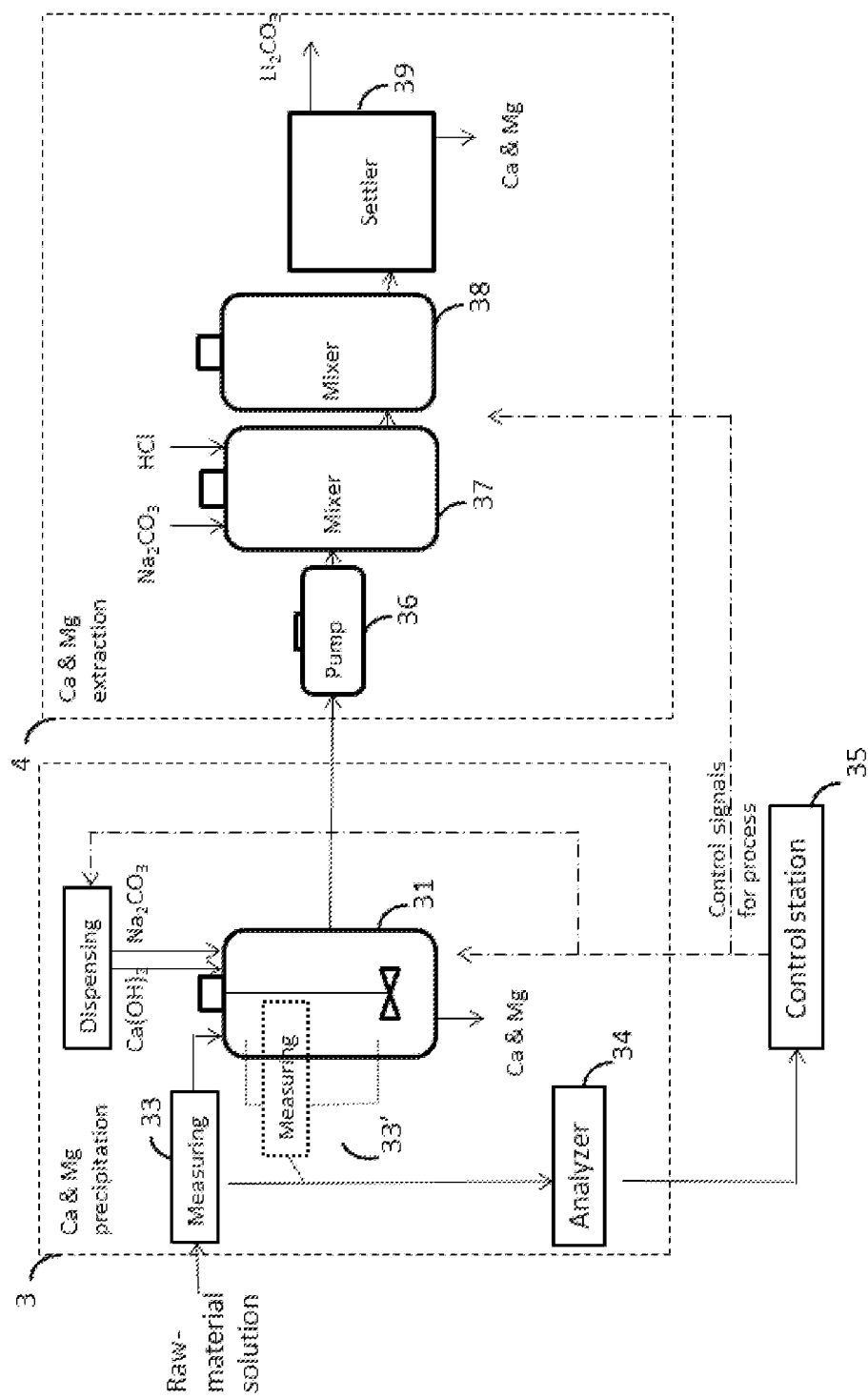
FIG. 3 is a simplified schematic view of equipment in an exemplary embodiment of the invention, by which a precipitation step 3 and an extraction step 4 may be implemented.
Figure 4:
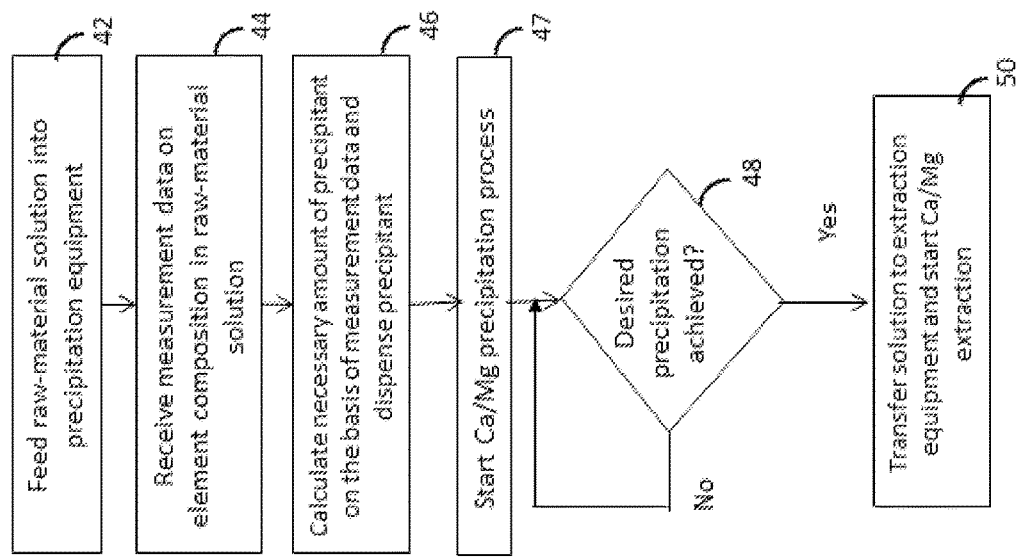
FIG. 4 is a flow chart that illustrates a control procedure of an exemplary embodiment of the invention.

As stated above, the precipitation step 3 may be carried out in any equipment suitable for the purpose. Correspondingly, the extraction step 4 may be carried out as liquid-liquid extraction in any equipment suitable for the purpose. FIG. 3 shows, by way of example, simplified equipment wherewith steps 3 and 4 may be implemented. A control system for the precipitation equipment 3 and the extraction equipment 4 is illustrated by a control station 35. The control station 35 may be, for instance, a process control system or a control room computer. The flow chart of FIG. 4 gives an example of a control procedure of the control system. The control process may be fully automated or semi-automated. In a semi-automated control process some of the control steps, particularly starting and ending of the precipitation step and the extraction step, may be performed manually through the control station by the operator.

Examples of commercially available reactors, applicable for use as a precipitation reactor unit 31, include OKTOP® reactors manufactured by Outotec. A precipitation reactor unit 31 may comprise two or more consecutive OKTOP® reactors, whereby precipitation is carried out in two or more stages. "Incomplete" precipitation in accordance with the exemplary embodiments of the invention may be implemented in various ways, one of which is given as an example in FIG. 4. In the example a lithium-containing raw-material solution is fed into the reactor unit 31 (step 42 in FIG. 4).

The composition of the raw-material solution prior to precipitation is measured with suitable concentration measurement equipment. In the example of FIG. 3, the raw-material solution to be fed into the precipitation reactor unit 31 passes through a measuring and sampling unit 33 that samples the solution, and the samples are conveyed to an analyzer 34 on a sampling line for analysis, for instance. The analyzer 34 provides measuring data or a measuring signal representing concentration (result of analysis), which is conveyed to the control station 35 (step 44 in FIG. 4). When the concentrations in the raw-material solution are known, the amount of precipitant, in other words, the amount of sodium carbonate $Na_2CO_3$ and optionally calcium hydroxide $Ca(OH)_2$ required for Mg/Ca precipitation, is calculated. The amount of the precipitant is adjusted at the control station 35 to be computationally such that a desired proportion of Ca and Mg contents will precipitate to solid matter. The control station 35 may control a dispenser 32 to dispense the desired precipitant quantity into the precipitation reactor unit 31 (step 46 in FIG. 4). In an alternative example, a small amount of the raw-material solution present in the precipitation reactor unit 31 may be recycled via a measuring and sampling unit 33', which samples the solution and the samples are conveyed to the analyzer 34 on the sampling line for analysis, for instance. In that case the measuring and sampling unit 33 of the first example may be omitted.

When the precipitation process is started (step 47 in FIG. 4), the raw-material solution and sodium carbonate $Na_2CO_3$, and optionally calcium hydroxide $Ca(OH)_2$, fed into the reactor unit 31, are mixed mechanically in the reactor unit 31 and they react forming a Ca and/or Mg precipitate.

Mixing is continued until a desired precipitation degree is achieved (step 48 in FIG. 4). In the exemplary embodiment of the invention, in step 48, mixing takes place for a given period of time, during which the desired precipitation is known to occur. The precipitation ends, when the dispensed amount of precipitant is used up, which determines the minimum mixing time. Alternatively or additionally, it is possible to determine the degree of precipitation by measurement, for instance, by means of the measuring unit 33' and the analyzer 34. In that case accurate dispensing of the precipitant is not necessarily needed. When deemed that the desired precipitation degree is achieved (e.g. on the basis of the precipitation time and/or measurement of composition), the control station 35 may convey a control signal or control signals which stop the precipitation step, transfer the solution to the extraction equipment 4 and start the Ca/Mg extraction process (step 50 in FIG. 4). The control station 35 may, for instance, open a valve in the reactor unit and/or start a pump for transferring the solution onwards. An example of a suitable analyzer, which may be used for implementing an analyzer unit, is Outotec Courier® 5 SL on-line analyzer manufactured by Outotec. After the reactor unit 31, the solution may be transferred to the extraction equipment 4 via a filter which filters out Ca/Mg precipitate.

An exemplary embodiment of the invention employs two consecutive reactors, one of which (preferably the first) is used for precipitating primarily magnesium Mg and the other (preferably the latter) is used for precipitating primarily calcium Ca. In that case calcium hydroxide $Ca(OH)_2$ alone may be fed into the first reactor and sodium carbonate $Na_2CO_3$ alone may be fed into the latter one.

In the example of FIG. 3, the extraction step 4 is performed as liquid-liquid extraction in equipment including a pump 36, mixers 37 and 38 and a settler 39. An example of suitable mixer-settler equipment is the one based on Outotec VSF® (Vertical Smooth Flow) SX technology. A dispersion overflow pump 36 is used for providing a dispersion flow for the solution that is received from the precipitation equipment 3. Examples of suitable mixers 37 and 38 are SPIROK mixers by Outotec. To the mixers are also fed sodium carbonate $Na_2CO_3$ and hydrochloric acid HCl. The mixers 37 and 38 are used for maintaining the dispersion coherent and for allowing time for the mass transfer reaction to occur. Finally the dispersion is fed into a settling pool 39, where the dispersion formed in the mixer is separated through differences in density into a Ca/Mg precipitate and a lithium carbonate $Li_2CO_3$ slurry.

Example

There is provided a lithium-containing raw-material solution that contains 1 g lithium, 7 g boron and totally 10 g calcium and magnesium. From the lithium-containing raw-material solution is removed the boron by liquid-liquid extraction. After the liquid-liquid extraction the lithium-containing raw-material solution contains boron less than 0.01 g. Thereafter, from the boron-depleted lithium-containing raw-material solution is removed calcium and magnesium through precipitation by adding calcium hydroxide and sodium carbonate to the solution, whereby the total content of magnesium and calcium dropped to less than 50% compared to the raw-material solution. After precipitation, the solution contains calcium and magnesium 4 g in total. After precipitation from the lithium-containing solution is removed the rest of magnesium and calcium by liquid-liquid extraction using di-2-ethyl hexyl phosphoric acid. There is obtained a lithium-containing product solution which contains 0.92 g lithium and whose total amount of calcium and magnesium is 0.01 g.

It will be apparent to a person skilled in the art that as technology advances, the basic idea of the invention may be implemented in many different ways. The invention and its embodiments are thus not restricted to the examples described above but may vary within the scope of the claims.

(m) SEQUENCE LISTING

Not Applicable.
The invention claimed is:
1. A process for producing a lithium-containing solution from a raw-material brine solution, the process comprising:
   a) a precipitation step, in which a first part of magnesium and calcium is removed from the raw-material brine solution by precipitation resulting in a first lithium-containing solution, and
   b) an extraction step, in which a second part of calcium and magnesium is removed from the first lithium-containing solution by liquid-liquid extraction, a resultant product being a second lithium-containing solution.
2. The process of claim 1, wherein the raw-material brine solution is a solution derived from a naturally occurring brine.
3. The process of claim 1, wherein the first part of magnesium and calcium contained in the raw-material brine solution is removed by using sodium carbonate as a precipitant.
4. The process of claim 1, wherein the first part of magnesium and calcium contained in the raw-material brine solution is removed by using calcium hydroxide as a precipitant.
5. The process of claim 1, wherein the first part of the calcium and magnesium to be removed is 50 to 95% by weight of the total amount of calcium and magnesium in the raw-material brine solution.
6. The process of claim 1, comprising:
   assaying the composition of the raw-material brine solution prior to precipitation,
   determining, on the basis of said composition of the raw-material brine solution, the amount of a precipitant that removes from the raw-material brine solution a predetermined first part of magnesium and calcium, and
   dispensing said determined amount of precipitant into a precipitation unit.
7. The process of claim 1, comprising:
   assaying a composition of a feed into the precipitation step and/or the composition of the solution in the precipitation,
   determining, on the basis of said composition, the amount of a precipitant that removes from the raw-material brine solution said first part of magnesium and calcium, and
   dispensing said determined amount of precipitant into a precipitation unit.
8. The process of claim 1, wherein the composition of a precipitation-stage solution is measured during the precipitation step, and the precipitation step is discontinued when the composition of the precipitation-stage solution achieves a set value.
9. The process of claim 8, wherein the set value is achieved when the total content of calcium and magnesium in the precipitation-stage solution is 50 to 95% by weight lower than the total content of calcium and magnesium in the raw-material brine solution.
10. The process of claim 8, wherein the precipitation step is continued until the total content of magnesium and calcium in the precipitation-stage solution is dropped 50 to 95% by weight of the corresponding content in the raw-material brine solution.
11. The process of claim 8, wherein the precipitation step is continued until the lithium content in the precipitation-stage solution is reduced at most 10% by weight of the corresponding content in the raw-material brine solution.
12. The process of claim 1, wherein the second part of calcium and magnesium is 5 to 50% by weight of the total amount of the calcium and magnesium in the entire raw-material brine solution.
13. The process of claim 1, wherein an organic extractant is used in the extraction step.
14. The process of claim 1, wherein a dialkyl phosphoric acid is selected from the group consisting of di-2-ethyl hexyl phosphoric acid, dialkyl phosphonic acid, dialkyl phosphinic acid, and a mixture thereof is used in the extraction step.
15. The process of claim 1, wherein the extraction step includes a stripping step of calcium and magnesium, and a hydrochloric-acid-containing aqueous solution is used as a stripping solution, which hydrochloric-acid-containing aqueous solution containing calcium and magnesium, obtained after the stripping step, is conveyed back to an earlier process step.
16. The process of claim 1, which further includes at least one pre-treatment step of the raw-material brine solution selected from the group consisting of the steps of evaporation of the raw-material brine solution, dissolution of calcium and magnesium carbonates in the raw-material brine solution, and removal of boron from the raw-material brine solution.
17. The process of claim 1, wherein sodium carbonate is added to the second lithium-containing solution to precipitate lithium carbonate.

* * * * *

UNITED STATES PATENT AND TRADEMARK OFFICE
CERTIFICATE OF CORRECTION

PATENT NO. : 9,725,787 B2  
APPLICATION NO. : 14/402178  
DATED : August 8, 2017  
INVENTOR(S) : Hannu Laitala Page 1 of 1

It is certified that error appears in the above-identified patent and that said Letters Patent is hereby corrected as shown below:

In the Specification

Column 1, Lines 5-9  "This is a national stage application filed under 35 USC 371 based on International Application No. PCT/FI2010/050811 filed October 19, 2010 and claims priority under 35 USC 119 of Finnish Patent Application No. 20096071 filed October 19, 2009." should be deleted Signed and Sealed this
Twenty-fourth Day of October, 2017

Joseph Matal
*Performing the Functions and Duties of the
Under Secretary of Commerce for Intellectual Property and
Director of the United States Patent and Trademark Office*